United States Patent Office 3,484,258
Patented Dec. 16, 1969

3,484,258
CONDUCTIVE GLASS-CERAMIC PRODUCT HAVING A HIGH DIELECTRIC CONSTANT AND METHOD OF MAKING SAME
Richard H. Redwine, Sylvania, and Anthony P. Schmid, Toledo, Ohio, assignors to Owens-Illinois, Inc., a corporation of Ohio
No Drawing. Filed Oct. 26, 1966, Ser. No. 589,531
Int. Cl. C03c 3/04; C04b 35/46; H01b 3/12
U.S. Cl. 106—39                     14 Claims

ABSTRACT OF THE DISCLOSURE

Crystallized glass ceramics having a high dielectric constant are formed from a melt of a thermally crystallizable glass composition containing silica and titanium or a titanium compound, under reducing or neutral conditions. The glass composition is crystallized to obtain a conductive phase of titanium oxide represented by the structural formula:

$$Ti_xO_{2x-1}$$

wherein $x$ is an integer of at least 1. The crystallized ceramic is thereafter subjected to an elevated temperature under oxidizing conditions to oxidize the surface of the ceramic and obtain the desired dielectric properties.

---

The present invention relates to crystallized glass-ceramics exhibiting high dielectric constants and methods for producing same.

Glass as a dielectric material has long been known but has been found to be lacking because of the instability of the electrical properties of glasses generally under D.C. field. In addition, the dielectric constants of most glass are relatively low; viz usually less than about 10.

Ceramic materials have been widely utilized as dielectrics. These ceramics are usually shaped by ceramic pressing and sintering techniques. However, the porosity and other shortcomings and disadvantages of such ceramic products detract from their usefulness as dielectrics.

Crystallized glass materials have been developed for use as dielectrics wherein a material possessing a high dielectric constant is added to the glass and is present in crystallized form therein. However, the dielectric constant of the ceramic product is limited by the presence of the glass matrix and the volume fraction of the high dielectric constant material. Thermodynamic considerations limit the volume fraction of the high dielectric constant material which can be present in a given composition.

Other methods for utilizing glasses as dielectrics have been devised such as depositing metal on a glass base or mixing a conductive metal with glass. In both instances, the product, although having a higher dielectric constant than the glass itself, still was not entirely satisfactory.

Accordingly, it is an object of the present invention to provide crystallized glass ceramic materials of high dielectric constant that obviate the disadvantages as enumerated above.

It is a further object of this invention to provide crystallized glass compositions that have a high dielectric constant and possess semi-conductive properties.

A still further object of this invention is to provide a process whereby crystallized glass ceramics having high dielectric constants are formed.

Another object of this invention is to provide glass-crystal articles possessing desirable dielectric properties.

These and other objects and advantages of the invention will appear more fully from the following description thereof.

In attaining the above objects, one feature of the present invention resides in crystallized glass ceramics made from glass compositions containing titanium or a titanium compound. The glass compositions to be hereinafter described are heat treated to crystallize a semi-conductive or conductive titanium dioxide phase from the glass to produce a crystallized ceramic product which is then subjected to oxidizing conditions. Said conductive titanium dioxide phase being represented by the structural formula:

$$Ti_xO_{2x-1}$$

where $x$ is an integer of at least 1.

A further feature of the present invention resides in forming a glassy melt from selected glass-forming components and a material which will induce the crystallization of a conductive titanium dioxide phase. Thereafter the crystallized glass is oxidized and the final product produced possesses a high dielectric constant. While not wishing to be bound by any particular theory, it is believed that interfacial polarization occurs at the interface of the conductive phase and the matrix and accounts for the high dielectric constant.

A still further feature of the present invention resides in the forming of a glass under reducing or neutral conditions, heat treating to form a crystallized material and thereafter subjecting the crystallized ceramic to oxidizing conditions.

A still further feature of this invention resides in the melting, casting and cooling of the glass composition, which has incorporated therein a reducing agent to crystallize a conductive or semi-conductive titanium dioxide phase from the glass, followed by a further heat treatment in an oxidizing atmosphere to obtain a ceramic product of the desired properties.

A still further feature of this invention resides in a semi-conductive crystallized glass ceramic having a high dielectric constant formed by melting, casting and cooling of the glass containing titanium or titanium dioxide under appropriate conditions to crystallize out a reduced rutile phase and thereafter subjecting the crystallized ceramic to oxidizing conditions.

A still further feature of this invention resides in a crystallized glass ceramic having a high dielectric constant formed from a conductive phase comprising rutile and reduced rutiles in a non-conductive matrix.

Other objects, features and advantages of the present invention will become apparent from the following detailed description thereof.

According to the present invention, a wide variety of glass compositions may be used, provided they contain titanium or titanium oxide, to form satisfactory dielectric materials. In this process the appropriate reducing or neutral conditions are employed to produce a conductive phase of the normal and reduced rutile in a non-conductive matrix.

The high dielectric compositions produced according to the teachings of the present invention may be used for a variety of purposes, such as low voltage ceramic capacitors. Because of their high dielectric properties, these materials are particularly valuable where space limits the size of the components.

Representative compositions prepared in accordance with the teachings herein have exhibited dissipation factors of 1% over a restricted frequency range and under 2% in the frequency range of 1 kc. to 400 kc. These values are higher than those presently available for paper and Mylar capacitors by a factor of four. In addition, dielectric constants of 20,000 with a loss of less than 2% have been obtained after the proper heat treatment.

In carrying out the present invention a glass melt is formed containing titanium or titanium oxide. A reducing agent may be present in the glass melt or a reducing or neutral atmosphere may be used for the purpose of providing appropriate conditions for inducing the crystallization of the conductive phases which may be represented by the structural formula:

$$Ti_xO_{2x-1}$$

wherein $x$ is an integer of at least 1. Crystallization of the melt may be achieved by cooling or by heat treatment techniques known in the art.

After the conductive phase is crystallized out the ceramic is subjected to oxidizing conditions, e.g., heating in air at elevated temperature for an extended period of time to produce the desired product. Examples set forth herein further illustrate the features of the present invention.

According to one aspect of the present invention, a representative glass composition based on a titania-silica system to which may be added alumina, calcium oxide and calcium fluoride to give a composition consisting essentially of the following components in the indicated weight percent based on total composition is as follows:

| Component: | Weight percent |
|---|---|
| $SiO_2$ | 20–90 |
| $TiO_2$ | 10–70 |
| $Al_2O_3$ | 0–23 |
| CaO | 0–19 |
| $CaF_2$ | 0–14 |

Glasses of the above formulation may be crystallized to form a crystallized glass ceramic which is then subjected to oxidizing conditions to produce the desired products. Various other ingredients may be present in the glasses as desired. Moreover, other glass compositions may also be used for present purposes.

Crystallized glass ceramics having high dielectric constants have been obtained by crystallizing a titania-silica system consisting essentially of the following compositional range in weight percent, based on total composition:

| Component: | Weight percent |
|---|---|
| $SiO_2$ | 30–75 |
| $TiO_2$ | 25–70 | with the preferred composition being silica 33.4% and titania 66.6%.

Other components may be added to the basic silica-titania system provided they do not adversely affect the electrical properties of the final product.

High dielectric constant crystallized ceramics have been obtained in cases where alumina is added to the silica-titania system wherein the composition consists essentially of the following components in the indicated weight percent based on total composition:

| Component: | Weight percent |
|---|---|
| $SiO_2$ | 30–90 |
| $TiO_2$ | 10–70 |
| $Al_2O_3$ | 0–18 |

The preferred group of compositions included in the above is shown below:

| Component: | Weight percent |
|---|---|
| $SiO_2$ | 61–65 |
| $TiO_2$ | 29–31 |
| $Al_2O_3$ | 4–10 |

Experimental data indicate the products of the present invention contain a crystalline phase represented by the structural formula:

$$Ti_xO_{2x-1}$$

where $x$ is an integer of at least 1, i.e., non-stoichiometric rutile dispersed in a matrix.

A further aspect of the present invention resides in the addition of calcium oxide, with or without calcium fluoride, to the silica-titania-alumina system such that the resultant composition consists essentially of the following components in weight percent, based on total composition:

| Component: | Weight percent |
|---|---|
| $SiO_2$ | 20–49 |
| $TiO_2$ | 12–57 |
| $Al_2O_3$ | 5–23 |
| CaO | 7–19 |
| $CaF_2$ | 0–14 |

The following Table I includes representative examples of the silica-titania system and are not considered limiting thereof in any way. All values are in weight percent based on the total composition:

TABLE I

| $SiO_2$ | $TiO_2$ | $Al_2O_3$ | CaO | $CaF_2$ | Typical K at 1 kc. |
|---|---|---|---|---|---|
| 33.4 | 66.6 | | | | 150,000 |
| 61.0 | 29.6 | 9.4 | | | 12,400 |
| 65.0 | 30.2 | 4.8 | | | 13,000 |
| 20.3 | 35.8 | 22.9 | 7.5 | 13.5 | 80,000 |
| 45.5 | 18.1 | 10.7 | 17.0 | 8.7 | 190,000 |
| 39.2 | 29.4 | 9.2 | 14.7 | 7.5 | 370,000 |
| 33.3 | 40.2 | 7.8 | 12.4 | 6.3 | 71,000 |
| 24.7 | 55.5 | 5.8 | 9.3 | 4.7 | 250,000 |
| 24.2 | 56.3 | 5.8 | 13.7 | | 20,000 |

In the above table "K" is the relative dielectric constant.

Any suitable form of the components may be used in working up the batches, e.g., oxides, carbonates, etc. Impurities may also enter the compositions, depending on the source of the starting materials, and provided they do not adversely affect the desired properties of the final product.

In the preparation of a crystallized glass ceramic according to the present invention, a glass composition containing titanium or a titanium compound is melted in a suitable atmosphere, preferably an essentially neutral atmosphere or a reducing atmosphere, thereafter the desired article may be shaped and crystallized while still in the same atmosphere. Following the crystallization process, the crystallized glass ceramic product is subjected to oxidizing conditions for a sufficient period of time to obtain a material having a sufficiently low dissipation factor. The product may be cooled after the crystallization and then heated to an elevated temperature in oxidizing atmosphere.

Alternatively, the glass composition is melted in a suitable atmosphere, preferably an essentially neutral atmosphere or a reducing atmosphere, and is subsequently subjected to a crystallizing heat treatment in a suitable atmosphere, preferably neutral or reducing, and then, after the crystallization heat treatment, without cooling, subjected to a further heat treatment in an oxidizing atmosphere.

In a still further embodiment, the glass composition may be melted and cooled as a glass in an appropriate atmosphere. The cooled glass may then be worked and shaped and the resultant article crystallized in an appropriate atmosphere which may be air or a neutral or a reducing atmosphere and subsequently heat treated in an oxidizing atmosphere.

The effect of the neutral or reducing atmospheres is to reduce some of the potentially conductive titania ($TiO_2$) present in the composition to the lower member of the homologous series; viz. $Ti_xO_{2x-1}$ where $x$ is an integer with a value of at least 1. The presence of a high density of reduced rutile in the glass crystal article is advantageous in that the article will have a small frequency dependence at frequencies below the dispersion peak and a high dielectric constant.

Many crystalline species may be present in the resultant article in addition to the conductive crystalline phase formed by this process without materially affecting the conductivity of the resultant article.

Examples of neutral and reducing atmospheres for use in this invention are argon, argon-hydrogen, nitrogen, nitrogen-hydrogen, carbon monoxide and nitrogen-oxygen gas mixtures. The function of this atmosphere, as described previously, is to form the reduced conductive phase such as the homologues of $TiO_2$ by the exclusion of the required amount of air or oxygen necessary to convert all titanium compounds to $TiO_2$. The use of nitrogen necessarily excludes all air, whereas when nitrogen-oxygen mixtures are utilized, the oxygen content is less than usually exists in air and thus the various homologues of titanium oxide are formed. The quantity of the various titanium oxide homologues formed will necessarily be dependent on the time period required for cooling the glass and the glass composition used.

An atmosphere of nitrogen-hydrogen excludes all oxygen and in addition aids in the reduction of $TiO_2$ and therefore is a desirable atmosphere. Experimentally it has been determined that atmospheres of higher reducing power have produced the best material.

When used, nitrogen-oxygen atmospheres generally contain oxygen in an amount less than 20 volume percent. Representative concentrations used consist of a 90–99 volume percent nitrogen and 1–10 volume percent oxygen.

In another embodiment of the present invention a shield gas technique is used wherein a stream of hydrogen is directed across the melt while the entire apparatus is shielded by a blanket of neutral gas such as nitrogen or argon. Much higher effective hydrogen concentrations in the region of the melt are achieved in this manner. High degrees of reduction has also been achieved by use of proper additives to the melt.

In another embodiment of the invention, a metal or reducing agent is added to the glass composition to reduce the metal oxide present to its conductive state, such as titanium-titanium oxide or carbon. In these cases no special reducing or neutral atmosphere is necessary and the reaction takes place in air.

Glass-crystal systems produced by the melting and cooling in the neutral and reduced atmospheres have exhibited dielectric constants in the range of one million. These components, however, also exhibit high dielectric losses.

To reduce the high dielectric losses, the articles are subjected to an elevated temperature of 600–800° C. or higher, while in an oxidizing atmosphere, for example 2 hours to 8 days. During this oxidation step the temperature should not exceed the temperature at which phase changes occur which are detrimental to the dielectric properties of the material. For example, it has been determined that for the silica-titania-alumina-calcia systems, the temperature should not substantially exceed 800° C. for any extended period of time.

The crystallized glass ceramics of the present invention exhibit semi-conductive properties which are believed to be due to reduced components such as the reduced rutile structures which have crystallized in the matrix. The interfacial polarization between the semi-conductive crystalline phase and the low conductivity matrix is believed to account for the high dielectric constant.

The following examples illustrate the present invention.

EXAMPLE I

A melt containing the following ingredients expressed in weight percent was prepared in a nitrogen-hydrogen atmosphere:

| Component: | Weight percent |
| --- | --- |
| $SiO_2$ | 45.1 |
| $TiO_2$ | 18.1 |
| $Al_2O_3$ | 10.7 |
| CaO | 17.0 |
| $CaF_2$ | 8.7 |

The atmosphere contained 90 volume percent nitrogen and 10 volume percent hydrogen. The melt was made at 1500° C. after which it was molded in graphite molds and cooled in the same reducing atmosphere to 30° C. The glass was crystallized by heating at a temperature of 800° C. for 4 hours. As a typical oxidizing treatment the crystallized product is subjected to a temperature of 700° C. for 72 hours in air.

EXAMPLE II

A melt containing the following ingredients was made in an air atmosphere:

| Component: | Weight percent |
| --- | --- |
| $SiO_2$ | 39.9 |
| $TiO_2$ | 29.2 |
| $Al_2O_3$ | 9.5 |
| CaO | 15 |
| $CaF_2$ | 5.9 |
| C | 0.5 |

The carbon was added as the reducing agent. The melt was made at a temperature of 1500° C. and then cast into a stainless steel mold and cooled to room temperature. Crystallization of the conductive phase occurred during the cooling step. The conductive crystalline phase was reduced rutile. For oxidation the material is heated at 700° C. for 72 hours in air.

EXAMPLE III

| Component: | Weight percent |
| --- | --- |
| $SiO_2$ | 47.6 |
| $Al_2O_3$ | 2.1 |
| $TiO_2$ | 30 |
| $B_2O_3$ | 1.4 |
| $Na_2O$ | 11.2 |
| CaO | 4.2 |
| MgO | 3.5 |

The above composition was melted at about 1400° C., using the shield gas technique with nitrogen-hydrogen mixture. The glass was crystallized upon cooling to 800° C. and held at that temperature for ½ hour.

The resultant crystallized glass was given an oxidation heat treatment as defined in Example I. A satisfactory material was obtained.

It has been observed that ceramic dielectrics produced without an oxidation treatment exhibit higher losses. By comparison, the process of the present invention produces products wherein the dielectric constant relationship is independent of the frequency. Therefore, it has been noted that the oxidation improves the loss and frequency characteristics of the ceramic material.

It will be apparent that the specific heat treatment conditions to crystallize the conductive phases from the glass composition will depend at least in part on the specific glass compositions and therefore it is not feasible to set forth precise limitations on said conditions. Generally the temperature and time may vary over a wide range, for example, 750–1000° C. and then from 2 to 3 minutes to 8–10 hours or more. Several days, e.g., 3 days, may be necessary for crystallization of the matrix. For many purposes ½ hour at 800–850° C. is adequate. Specific examples hereinabove show representative conditions.

The crystallized glasses prepared by the present invention are useful as replacement for ceramic dielectrics, particularly in ranges up to 30 mc. Other possible uses include replacement for electrolytic capacitors and tantalytic capacitors especially at high temperatures.

Other applications for high dielectric materials prepared according to the present invention are as radar absorptive skins, radio and television capacitor elements and in filter applications.

What we claim is:

1. A method for forming a crystallized glass ceramic having a high dielectric constant comprising forming a melt of a thermally crystallizable glass composition containing silica and titanium or a titanium compound under reducing or neutral conditions, crystallizing the composition to obtain a conductive phase of titanium dioxide represented by the structural formula:

$$Ti_xO_{2x-1}$$

where $x$ is an integer of at least 1, subjecting the crystallized ceramic to an elevated temperature under oxidizing conditions for a period of time sufficient to oxidize the surface of said ceramic to obtain the desired dielectric properties, said elevated temperature being less than that at which the conductive phase would be adversely affected.

2. A method for forming a crystallized glass ceramic having a high dielectric constant as defined in claim 1, wherein a neutral or reducing atmosphere is used.

3. A method for forming a crystallized glass ceramic having a high dielectric constant as defined in claim 1 wherein a reducing agent is present in the melt.

4. A method as defined in claim 2, wherein the reducing atmosphere is a mixture of nitrogen and hydrogen gas.

5. A method for forming a crystallized ceramic having a high dielectric constant as defined in claim 1 wherein a metal or carbon is added as the reducing agent to said thermally crystallizable glass composition.

6. A method for forming a crystallized glass ceramic as defined in claim 1, wherein said glass is crystallized by cooling the melt under controlled conditions.

7. A method for forming a crystallized glass ceramic as defined in claim 1 wherein the glass composition is heat treated at a temperature of from about 750° C. to 1000° C. for a period of time ranging from 2 minutes to 3 days.

8. A method for forming a crystallized glass ceramic having a high dielectric constant as defined in claim 1, wherein after the conductive phase is crystallized out it is subjected to an elevated temperature under oxidizing conditions at a temperature range of 600 to 800° C. for a period of 2 hours to 8 days.

9. A method for forming a crystallized glass ceramic having a high dielectric constant as defined in claim 1, wherein said thermally crystallizable glass composition consists essentially of the following components in the indicated weight percent ranges, based on the total composition:

| Component: | Weight percent |
|---|---|
| $SiO_2$ | 20–90 |
| $TiO_2$ | 10–70 |
| $Al_2O_3$ | 0–23 |
| CaO | 0–19 |
| $CaF_2$ | 0–14 |

10. A method for forming a crystallized glass ceramic having a high dielectric constant as defined in claim 1, wherein said thermally crystallizable glass composition consists essentially of the following components in the indicated weight percent ranges, based on the total composition:

| Component: | Weight percent |
|---|---|
| $SiO_2$ | 30–75 |
| $TiO_2$ | 25–70 |

11. A method for forming a crystallizable glass ceramic having a high dielectric constant as defined in claim 1, wherein said thermally crystallizable glass composition consists essentially of the following components in the indicated weight percent ranges, based on the total composition:

| Component: | Weight percent |
|---|---|
| $SiO_2$ | 30–90 |
| $TiO_2$ | 10–70 |
| $Al_2O_3$ | 0–18 |

12. A method for forming a crystallized glass ceramic having a high dielectric constant as defined in claim 1, wherein said thermally crystallizable glass composition consists essentially of the following components in the indicated weight percent ranges, based on the total composition:

| Component: | Weight percent |
|---|---|
| $SiO_2$ | 61–65 |
| $TiO_2$ | 29–31 |
| $Al_2O_3$ | 4–10 |

13. A method for forming a crystallized glass ceramic having a high dielectric constant as defined in claim 1, wherein said thermally crystallizable glass composition consists essentially of the following components in the indicated weight percent ranges, based on the total composition:

| Component: | Weight percent |
|---|---|
| $SiO_2$ | 20–90 |
| $TiO_2$ | 12–70 |
| $Al_2O_3$ | 0–23 |
| CaO | 0–19 |
| $CaF_2$ | 0–14 |

14. A crystallized glass ceramic formed according to the method as defined in claim 1.

References Cited

UNITED STATES PATENTS

| | | | |
|---|---|---|---|
| 3,028,656 | 4/1962 | Herbert | 106—39 |
| 3,195,030 | 7/1965 | Herczog et al. | 65—33 |
| 3,380,818 | 4/1968 | Smith | 65—33 |
| 2,633,543 | 3/1953 | Howatt | 106—39 |

S. LEON BASHORE, Primary Examiner

E. R. FREEDMAN, Assistant Examiner

U.S. Cl. X.R.

106—39, 52; 317—258; 252—63.5, 500; 161—193; 65—30, 32, 33